United States Patent [19]

Kim

[11] Patent Number: 5,526,503
[45] Date of Patent: Jun. 11, 1996

[54] VIRTUAL ADDRESSING BUFFER CIRCUIT

[75] Inventor: Jason S. Kim, Los Angeles, Calif.

[73] Assignee: AST Research, Inc., Irvine, Calif.

[21] Appl. No.: 132,643

[22] Filed: Oct. 6, 1993

[51] Int. Cl.$^6$ ........................................ G06F 12/02
[52] U.S. Cl. .................... 395/413; 395/427; 395/410
[58] Field of Search .............................. 395/400, 425, 395/725, 700, 401, 412, 419, 413

[56] References Cited

U.S. PATENT DOCUMENTS

| | | | |
|---|---|---|---|
| 5,101,339 | 3/1992 | Farman et al. | 395/400 |
| 5,109,521 | 4/1992 | Culley | 395/800 |
| 5,161,218 | 11/1992 | Catlin | 395/425 |
| 5,187,792 | 2/1992 | Dayan et al. | 395/725 |
| 5,193,170 | 3/1993 | Lam | 395/425 |
| 5,210,875 | 5/1993 | Bealkowski et al. | 395/700 |
| 5,301,328 | 4/1994 | Begur et al. | 395/700 |
| 5,305,445 | 4/1994 | Nishikawa | 395/400 |
| 5,341,494 | 8/1994 | Thayer et al. | 395/425 |

OTHER PUBLICATIONS i486™ Microprocessor Programmer's Reference Manual, Intel Corporation, 1990, Sections 5.3 5.4 and 10.5, pp. 5–17 through 5–25, and pp. 10–6 through 10–9.

Intel486™ DX Microprocessor Data Book, Intel Corporation, 1991, pp. 1 and 131–134.

Primary Examiner—David K. Moore
Attorney, Agent, or Firm—Knobbe, Martens, Olson & Bear

[57] ABSTRACT

A virtual addressing buffer circuit has improved address mapping and control flexibility for improved physical resource management and a unique opportunity for forward-compatible system design. The virtual addressing buffer formats the output address utilizing a format register as a combination of the new address bits and the original input address bits. The ability to format the output address enables the user to replace certain address bits without requiring that the entire address be replaced. The virtual addressing buffer controls the output of several command signals to external circuits to indicate how the system should respond to the address output from the virtual addressing buffer. The command signals are controlled by a command register and are output from the virtual addressing buffer only when an address match has been verified. The virtual addressing buffer circuit filters out certain bits of an input address as indicated by a filter register before it verifies that the input address matches a stored address. The bit pattern in the filtering register is not fixed, so any bit location in the input address can be filtered out before the address is verified. Once an address match has been detected, the virtual addressing buffer circuit replaces the entire input address with a new formatted address.

8 Claims, 5 Drawing Sheets

VIRTUAL ADDRESSING BUFFER CIRCUIT

BACKGROUND OF THE INVENTION

1. Field of the Invention

The present invention relates to the field of translation look-a-side buffers, and, more particularly, it relates to the ability to translate a given input address to a user specified address location.

2. Description of the Related Art

A standard translation look-a-side buffer of the prior art enables a user to transfer an address request from a central processing unit (CPU) to an alternative address location in the system memory. The basic operation of a translation look-a-side buffer entails comparing an input address to a stored address to verify if the two addresses match each other. If no match has occurred, the input address is transferred through the buffer and is output to the system bus without modification. If a match occurs, the input address is replaced with a stored output address which is transferred to the system bus to replace the input address.

The operation of translation look-a-side buffers of the prior art is limited to a direct translation of an input memory location to a specified output memory location. The translation look-a-side buffer must compare the entire input address with the entire stored address in order to determine if an address translation is to occur. In addition, the translation look-a-side buffer must replace the entire input address with a new output address. These two requirements have greatly limited the number of possible applications of the translation look-a-side buffer. The look-a-side buffer is only useful in those applications where it is desirable to directly translate one address location to a new address location.

In order to provide improved memory system optimization, a need exists for a more flexible memory translation circuit that masks out certain bits from the input address which may be irrelevant to the comparison with the stored address before determining if the address translation is to occur. In addition, it is desirable to isolate certain portions of the input address that remain unchanged when the address translation occurs.

SUMMARY OF THE INVENTION

The present invention is a virtual addressing buffer circuit which provides improved address mapping flexibility over the traditional translation look-a-side buffers of the prior art. The preferred embodiment of the virtual addressing buffer circuit comprises a filtering and verification portion, a formatting portion, a translation portion and a command portion. The filtering and verification portion compares the input address to a stored match address, after filtering out any address bits which are not relevant to the determination of whether the two addresses match. The formatting portion generates an output address as a combination of bits from a translated address and from the original input address as determined by a user specified format. The translation portion determines if the formatted address or if the input address is output from the virtual addressing buffer. The ability to format the output address enables the user to replace certain bits of the input address with the corresponding bits from the translated address without requiring that the entire input address be replaced.

A preferred embodiment of the filtering and verification portion of the virtual addressing buffer comprises a 32-bit filtering and comparison circuit; a match register which stores a match address; and a filtering register which stores a filtering address that indicates the bit positions of the input address which are not to be considered in the comparison of the input address to the stored match address. The bit pattern in the filtering register is not fixed, so any bit location in the input address can be masked out of the comparison before the address is verified. In a preferred embodiment of the virtual addressing buffer, each bit of the match address is compared with each bit of the input address. The output of the comparison is logically ORed with a corresponding bit of the filtering address to enable certain bits which have a don't care condition to be masked out of the address comparison. The output of the 32-bit filtering comparison circuit includes a HIT signal, an active high signal, which indicates if the filtered input address matches the stored match address. If the filtered input address matches the stored match address, the HIT signal is active. If the filtered input address does not match the address stored in the match register, the HIT signal is inactive.

The format portion of the virtual addressing buffer circuit operates in parallel with the filtering portion. In a preferred embodiment, the format portion comprises thirty-two 2×1 multiplexers; a translate register which stores a translated address; and a format register which indicates which bits of an output address are to be from the translated address and which bits are to remain the same as the input address. In a preferred embodiment of the virtual addressing buffer circuit, each bit of the input address is connected to a first input of one of the 2×1 multiplexers, and a corresponding bit of the translate register is connected to a second input of one of the thirty-two 2×1 multiplexers. The select line of each of the 2×1 multiplexers is connected to the corresponding bit of the format register which selects between an input address bit and a translated address bit for output from the virtual addressing buffer circuit. If the corresponding format bit at the select line is at a logic low level, the translated address bit is output from the multiplexer. If the corresponding format bit is at an inactive level, the input address is output from the multiplexer. The outputs of each of the thirty-two 2×1 multiplexers are combined to form a formatted output address.

The translation portion of the virtual addressing buffer selects between the input address and the formatted output address for output from the virtual addressing buffer circuit depending on the condition of the HIT signal. In a preferred embodiment, the translation portion comprises a 32-bit 2×1 multiplexer. A first input of the multiplexer is connected to the input address and a second input is connected to the formatted output address. The select line of the multiplexer is connected to the HIT signal which determines which address is output from the virtual addressing buffer. If the HIT signal is at an active level, indicating that the filtered input address matches the stored match address, the formatted output address is selected for output from the virtual addressing buffer. If the HIT signal is at an inactive level, indicating that the filtered input address does not match the stored match address, the original input address is selected for output from the virtual addressing buffer circuit without alteration.

In addition to the address manipulation features described above, the command portion of the virtual addressing buffer circuit controls the output of several command signals to external circuits to indicate how the circuitry external to the virtual addressing buffer should respond to the address output from the virtual addressing buffer. The command signals, all of which are active high signals, are an ignore signal, a terminate signal, and a bypass signal. A preset condition of each of these signals are stored in a command register. The preset conditions of the command signals are ANDed with the HIT signal and are therefore output from the virtual addressing buffer at an active level only when the HIT signal is active. The ignore signal is used to inform a slow downstream bus to ignore the address from the virtual addressing buffer circuit and enables a device on a faster local bus to respond to the address request. The bypass signal is used to block the faster local bus from responding to the address from the virtual addressing buffer circuit and lets the slower downstream bus respond to the address request. The terminate signal is used for more complex responses to address requests, such as the emulation of devices that are not physically present. The detection of the terminate command by a bus controller causes the controller to send an end of cycle command back to the CPU that requested the address of the emulated device and enables an emulation routine to respond to the address request.

In a preferred embodiment of a dual comparison virtual addressing buffer, two virtual addressing buffers are formed in one integrated circuit whereby two address comparisons and redirections are performed contemporaneously. In a preferred embodiment, a first 32-bit filtering comparison circuit is connected to an input address, a first match address and a first filtering address. The first filtering address masks out those address bits which are not important to the first address comparison. A second 32-bit filtering comparison circuit is connected to the same input address, a second match address and a second filtering address. The second filtering address masks out a different set of address bits which are not important to the second address comparison. An output of the first 32-bit comparison circuit is a HIT0 signal which is an active high signal. The HIT0 signal indicates when the first filtered input address is equivalent to the first match address. An output of the second 32-bit filtering comparison circuit is a HIT 1 signal which is an active high signal. The HIT1 signal indicates when the second filtered input address is equivalent to the second match address.

Contemporaneously with the address comparisons, two formatted output addresses are generated. A first set of thirty-two single-bit multiplexers is used to create a first formatted output address from the bits of the input address and from a first lookup address. A select input of each multiplexer is connected to a bit from a first format address which determines if a bit from the input address or from the first lookup address should be used to form the first formatted output address. A second set of thirty-two single-bit multiplexers is used to create a second formatted output address from the bits of the input address and from a second lookup address. A select input of each multiplexer is connected to a bit from a second format address which determines if a bit from the input address or from the second lookup address should be used to form the second formatted output address. Outputs of the first thirty-two multiplexers are combined to form a first formatted output address. Outputs of the second thirty-two multiplexers are combined to form a second formatted output address.

The first formatted output address and the second formatted output address are connected to a first 32-bit 2×1 multiplexer. The HIT0 signal is connected to a select line of the first multiplexer and is used to select between the first formatted output address and the second formatted output address for output as a final formatted output address. If the HIT0 signal is at an active level, the first formatted output address is selected for output as the final formatted output address. If the HIT0 signal is at an inactive level, the second formatted output address is selected for output. The use of the HIT0 signal as the select signal for the first 32-bit multiplexer indicates that the first formatted output address has priority over the second formatted output address. Thus, if the HIT1 signal and the HIT0 signal are both active, indicating that a match was made with both filtered input addresses, then the first formatted output address is selected for output over the second formatted output address.

In a preferred embodiment, the HIT0 signal and the HIT1 signal are each connected to a two-input OR gate to determine if a match occurred between either of the stored input addresses and the filtered input address to determine the translated address which is output from the dual comparison virtual addressing buffer circuit. The input address and the final formatted output address are connected to a second 32-bit 2×1 multiplexer. An output of the OR gate is inverted by an inverter and then connected to a select line of the second 32-bit 2×1 multiplexer. If neither the HIT0 signal nor the HIT1 signal are active, then the filtered input address did not match either of the stored match addresses and the input address is selected for output as the translated memory address without alteration. If either the HIT0 signal or the HIT1 signal is active, then a match occurred between one of the filtered input addresses and one or more of the stored match addresses, and the final formatted output address is selected for output as the translated memory address. Thus, the dual comparison virtual addressing buffer completes the two address comparisons and redirections in approximately the same time that it took to complete the single comparison virtual addressing buffer circuit to complete a single comparison.

Several common programming procedures can be improved using either the single or double comparison embodiments of the virtual addressing buffer. First, "paged system BIOS shadowing" can be improved by enabling the most frequently accessed code from the system BIOS to be copied from the relatively slow access ROM storage to the local memory of the high-speed processor. After the BIOS is copied to the local memory, the virtual addressing buffer is used to redirect the data requests from the slow downstream BIOS to the faster local memory where the BIOS commands are now stored.

Second, to better utilize the existing physical memory, "memory ranged blanking" can be implemented to enable the use of memory blocks which are reserved by the CPU for applications which are not in use.

Third, program debugging, I/O trapping and device emulation can be enhanced using the terminate features of the virtual addressing buffer circuit.

These and other features and advantages of the present invention are set forth more completely in the accompanying drawings and the following description.

DETAILED DESCRIPTION OF THE PREFERRED EMBODIMENTS

Figure 1:
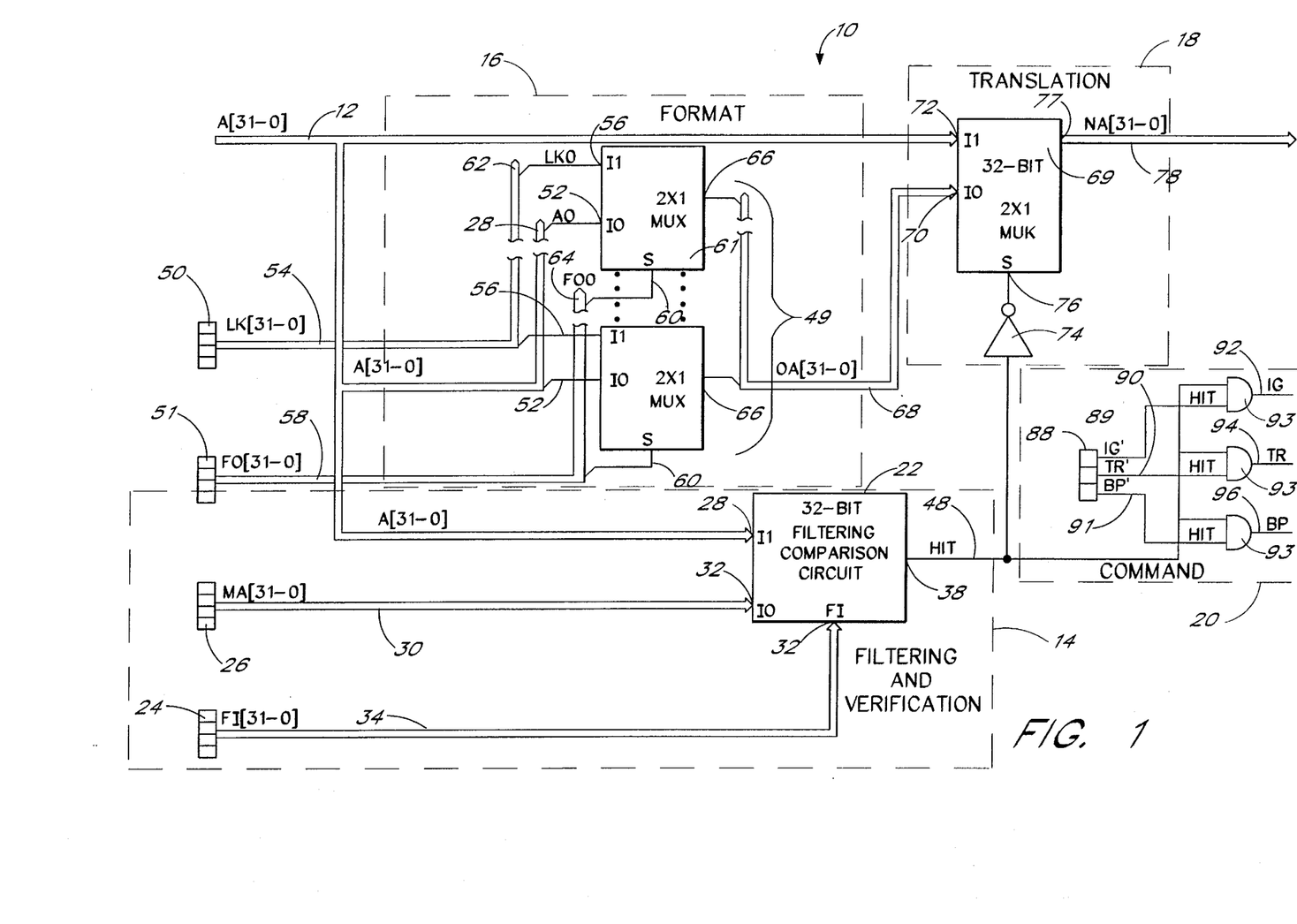
FIG. 1 is a schematic diagram of a preferred embodiment of the virtual addressing buffer circuit of the present invention.

The present invention is a virtual addressing buffer circuit which provides improved address mapping flexibility for memory system optimization. FIG. 1 illustrates a preferred embodiment of a 32-bit virtual addressing buffer circuit 10. The virtual addressing buffer circuit 10 performs a number of operations on an input address A[31-0] on a bus 12 to determine if the input address A[31-0] is to be translated to a new address, if at all.

The preferred embodiment of the virtual addressing buffer circuit 10 comprises a filtering and verification portion 14, a format portion 16, a translation portion 18 and a command portion 20. A brief description of each of these portions follows, while a more detailed description is provided below. The filtering and verification portion 14 compares an input address to a stored match address and determines if the corresponding bits (i.e., the bits in the same bit position) of the two addresses are equivalent. Next, the filtering and verification portion 14 filters out some of the bits from the address comparison whose values do not matter in the determination of whether the input address is to be translated or not. Lastly, the filtering and verification portion 14 outputs a signal to indicate if a match of the relevant bits has occurred. The format portion 16 creates a formatted output address which is a combination of bits from the input address A[31-0] and from a stored translation address. The translation portion 18 selects which address is to be output from the virtual addressing buffer circuit 10 depending upon whether the filtering and verification portion 14 detects a match or not. If a match is detected, the formatted output address is output from the virtual addressing buffer circuit 10. If a match is not detected, the original input address A[31-0] is output from the virtual addressing buffer circuit 10 without alteration. The command portion 20 outputs a series of command signals which indicate the manner in which the external logic should respond to the translated address which is output from the virtual addressing buffer circuit 10 of the present invention.

Figure 5:
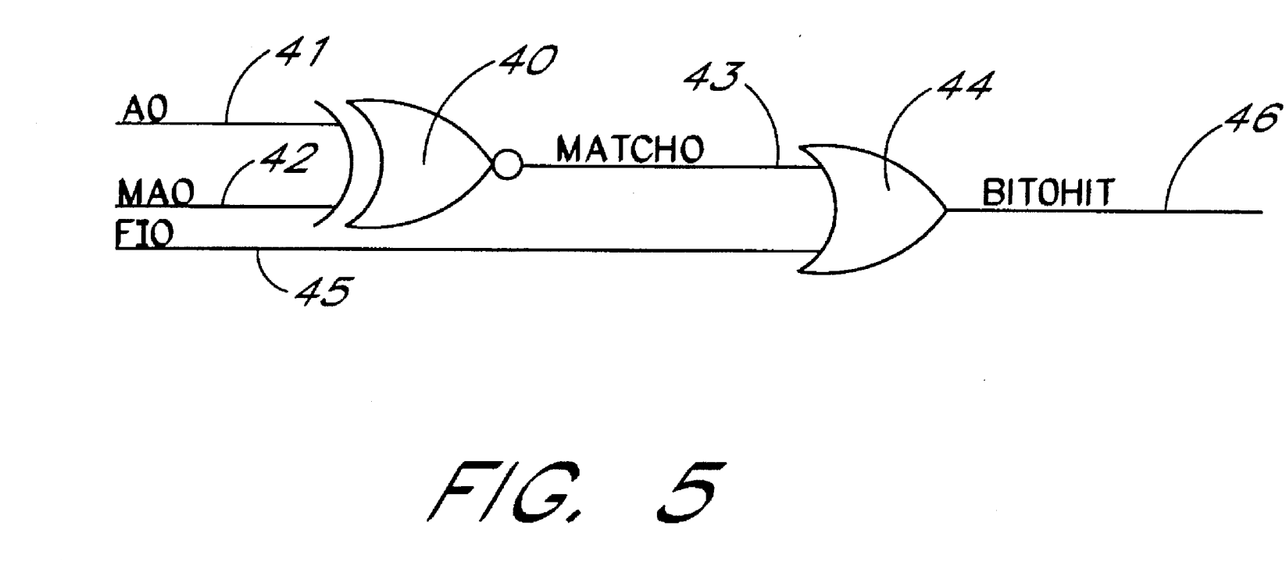
FIG. 5 is an exemplary circuit of the function performed by the filtering comparison circuit illustrated in FIG. 1.

As indicated in FIG. 1, the filtering and verification portion 14 of the virtual addressing buffer circuit comprises a 32-bit filtering comparison circuit 22; a filtering register 24 which stores a filtering address FI[31-0]; and a match register 26 which stores a match address MA[31-0]. The input address A[31-0] on the bus 12 is connected to an I1 input 28 of the filtering comparison circuit 22. The match address MA[31-0] on a bus 30 is connected to an I0 input 32 of the filtering comparison circuit 22. The filtering address FI[31-0] on a bus 34 is connected to an FI input 36 of the filtering comparison circuit 22. In a preferred embodiment, each address bit of the input address A[31-0] on the bus 12 is compared to a respective address bit of the stored match address MA[31-0] on the bus 30 to determine whether the address bits match. The match output for each bit will be a logical one if a match occurs. This bit comparison has the effect of an exclusive-NOR function represented by a XNOR gate 40 in FIG. 5 for bit 0. As illustrated in FIG. 5, the inputs of the representative XOR gate 40 are an A0 bit on a line 41 and a MA0 bit on a line 42, and the output of the XOR gate 40 is a match output signal, MATCH0, on a line 43, which is active high when the inputs match. The match output is logically ORed with a respective bit of the filtering address FI[31-0] to mask out the unimportant address bits from effecting the output of the address verification. This function is illustrated in FIG. 5 by an OR gate 44 whose inputs are 'the MATCH0 signal on the line 43 and the FI0 bit on line 45. An output of the OR gate 44 is a BIT0HIT signal on a line 46, which indicates that bit 0 of the input address matches bit 0 of the match address, or bit 0 has been filtered out of the address data comparison. The address bits of the input address A[31-0] whose values must match the stored match address MA[31-0] for an address translation to occur are indicated by storing a logic low value (i.e., a zero), at the corresponding bit location in the filtering register 24. The address bits of the input address A[31-0] whose values do not need to match the stored match address for an address translation to occur (i.e., those address bits that have a don't care condition), are indicated by storing a logic high value (i.e., a one), at the corresponding bit location in the filtering register 24. Each OR gate 44 with an address comparison input of a don't care bit will be forced to a logic high value at the output by the logic high value of the filtering address bit regardless of the result of the address comparison. On the other hand, if the respective address bit compare (i.e., both are a logic one or both are a logic zero), then the output of the OR gate 44 will be a logic one irrespective of the filter bit. The outputs of all the OR functions, such as the BIT0HIT signal on the line 46 of the exemplary circuit of FIG. 5, are logically ANDed together to determine if all of the relevant address bits of the input address A[31-0] match the respective bits of the stored match address MA[31-0]. If a match has occurred, an output 38 of the filtering comparison circuit 22 is at a logic high level. If a match did not occur, the output 38 of the filtering comparison circuit 22 is at a logic low level. The output 38 of the 32-bit filtering comparison circuit 22 is connected to a HIT signal on the line 48 which is an active high signal (i.e., if the comparison is true, the HIT signal 48 is at a logic high level). The HIT signal on the line 48 conveys the result of the address comparison from the filtering and verification portion 14 to the translation portion 18 and the command portion 20 of the virtual addressing buffer circuit 10.

As indicated in FIG. 1, the format portion 16 of the virtual addressing buffer circuit 10 operates in parallel with the filtering and verification portion 14 to create a formatted output address OA[31-0]. In a preferred embodiment, the format portion 16 comprises 32 single-bit 2×1 multiplexers 49, a translate or lookup register 50 and a format register 51. The translate register 50 stores a lookup address LK[31-0] which indicates the desired translated address location. The format register 51 stores a format address FO[31-0] which comprises a series of bits that indicate which bits from the original input address A[31-0] on the bus 12 are to remain unchanged and which bits are replaced with the corresponding bits from the lookup address LK[31-0]. If an address bit is to be taken from the input address on the bus 12, a logic high value, i.e, a one, is placed in the corresponding bit location in the format register 51. If an address bit is to be taken from the lookup address LK[31-0], a logic low value (i.e., a zero), is placed in the corresponding bit location in the format register 51.

The thirty-two single-bit 2×1 multiplexers 49 are used to select each of the bits which form the formatted output address OA[31-0] from the corresponding bits of the lookup address LK[31-0] and the input address A[31-0]. Each bit of the input address A[31-0] on the bus 12 is connected to an I0 input 52 of one of the thirty-two single-bit 2×1 multiplexers 49. A corresponding bit of the lookup address LK[31-0] on a bus 54 is connected to an I1 input 56, of the corresponding single-bit 2×1 multiplexer 49. A corresponding bit of the format address FO[31-0] on a bus 58 is connected to a select input 60 of the corresponding single-bit 2×1 multiplexer 49. For example, the first input address bit A0 28 is connected to the I0 input 52 of a first 2×1 multiplexer 61. A first lookup address bit LK0 62 is connected to the I1 input 56 of the first 2×1 multiplexer 61. A first format bit FO0 64 is connected to the select input 60 of the first 2×1 multiplexer 61. This configuration is repeated for the remaining bits of the input address A[31-0] on the bus 12, the lookup address LK[31-0] on the bus 54 and the format address FO[31-0] on the bus 58 for each of the remaining multiplexers 49. If a given bit of the format address FO[31-0] is at a logic low value (i.e. a logic zero), the address bit at the I0 input 52 of the single-bit 2×1 multiplexer 49, in this case the corresponding bit from the input address A[31-0], are sent to an output 66 of the multiplexer 49. If a given bit of the format address FO[31-0] is at a logic high value (i.e., a logic one), the address bit at the I1 input 56, in this case the corresponding bit of the lookup address LK[31-0], will be sent to the output 66 of the multiplexer 49.

The outputs 66 of each of the thirty-two single-bit multiplexers 49 are combined to form a formatted output address OA[31-0] on a bus 68 which is delivered to the filtering and translation portion 14 of the virtual addressing buffer circuit 10.

The translation portion 18 selects between the input address A[31-0] on the bus 12 and the formatted address output address OA[31-0] on the bus 68 for output from the virtual addressing buffer circuit 10. The translation portion 18 comprises a 32-bit 2×1 multiplexer 69. The 32-bit formatted output address OA [31-0] on the bus 68 is routed to an I0 input 70 of the 32-bit 2×1 multiplexer 69. The original 32-bit input address A[31-0] on the bus 12 is connected to an I1 input 72 of the 32-bit 2×1 multiplexer 69. The HIT signal 48, which is generated by the filtering and verification portion 14 of the virtual addressing buffer 10, is sent through an inverter 74 to a select input 76 of the 2×1 multiplexer 69 to select which of the two 32-bit address are sent to an output 77 of the 2×1 multiplexer 69. The output 77 of the 2×1 multiplexer 69 is connected to a translated memory address NA[31-0] on a bus 78 which is output from the virtual addressing buffer circuit 10. If the HIT signal on the line 48, is at an active level (i.e., the relevant bits of the input address A[31-0] on the bus 12 are equivalent to the corresponding bit of the match address MA[31-0] on the bus 42), the signal at the select input 76 of the multiplexer 69 is at a low logic level. If the signal at the select input 76 of the multiplexer is at a logic low level, the address at the I0 input 70, which in this case is the formatted output address OA[31-0] on the bus 68, will be selected to be output as the translated memory address NA[3-10] on the bus 78. If the HIT signal on the line 48 is inactive, the signal at the select input 76 of the 32-bit multiplexer 69 will be at a high logic level. If the signal at the select input 76 of the multiplexer 69 is at a high logic level, the address at the I1 input 72, which in this case is the original address A[31-0] on the bus 12, will be selected to be output as the translated memory address NA[31-0] on the bus 78 without alteration.

The command portion 20 outputs a series of command signals which indicate the manner in which the external logic should respond to the translated memory address NA[31-0] on the bus 78 which is output from the virtual addressing buffer circuit 10. The individual functions of the command signals will be described in more detail later; however, their communication with the circuitry of the virtual addressing buffer circuit 10 is described hereinafter.

The preset values of the command signals are stored in a command register 88. The preset command signals are a preset ignore signal (IG'), a preset bypass signal (BP'), and a preset terminate signal (TR'). The preset command signals which are stored in the command resister 88 are active high signals and are set to a predetermined value by the user. The command signals are only output when the virtual addressing buffer circuit 10 has translated the input address A[31-0] to a new translated address value and the external circuitry needs to operate in a different manner in response to the translated address. Therefore, the preset command signals that are stored in the command register 88 are ANDed with the HIT signal on the line 48 before they are output from the virtual addressing buffer circuit 10 to ensure that the command signals are only output at an active level when the HIT signal on the line 48 is at an active level. The IG' signal on a line 89, the TR' signal on a line 90, and the BP' signal on a line 91 are each connected to a first input of a two input AND gate 93. A second input of each of the two input AND gates 93 is connected to the HIT signal on the line 48. The outputs of each of the AND gates 45 are an ignore signal (IG) on the line 92, a terminate signal (TR) on the line 94 and a bypass signal (BP) on the line 96. Each of the command signals which are output from the virtual addressing buffer circuit 10 are active high signals and can only be output at an active level when the input address A[31-0] on the bus 12, after filtering, matches the stored match address MA[31-0] on the bus 30.

The virtual addressing buffer 10 is advantageous over conventional translation look-a-side buffers, as conventional translation look-a-side buffers only connect a series of address bits to the translation look-a-side buffer (i.e., the upper eight bits or the lower sixteen bits of a 32-bit address), and do not enable any filtering of the address beyond the selection of bits which are connected to the buffer. The filtering and verification portion 14 of the virtual addressing buffer 10 enables the masking of any of the thirty-two bits of the input address 12, all thirty-two of which are connected as inputs of the virtual addressing buffer circuit 10. Further, the virtual addressing buffer circuit 10 enables each bit of the 'translated memory address NA[31-0] on the bus 78 to be selected from either the input address A[31-0] on the bus 12 or from the look-up address LK[31-0] on the bus 52. The conventional translation look-a-side buffers only enable the direct mapping of an input address to an output address and do not enable the advantageous selection of the bits of the output address from both a translated address and from the original input address.

Figure 2:
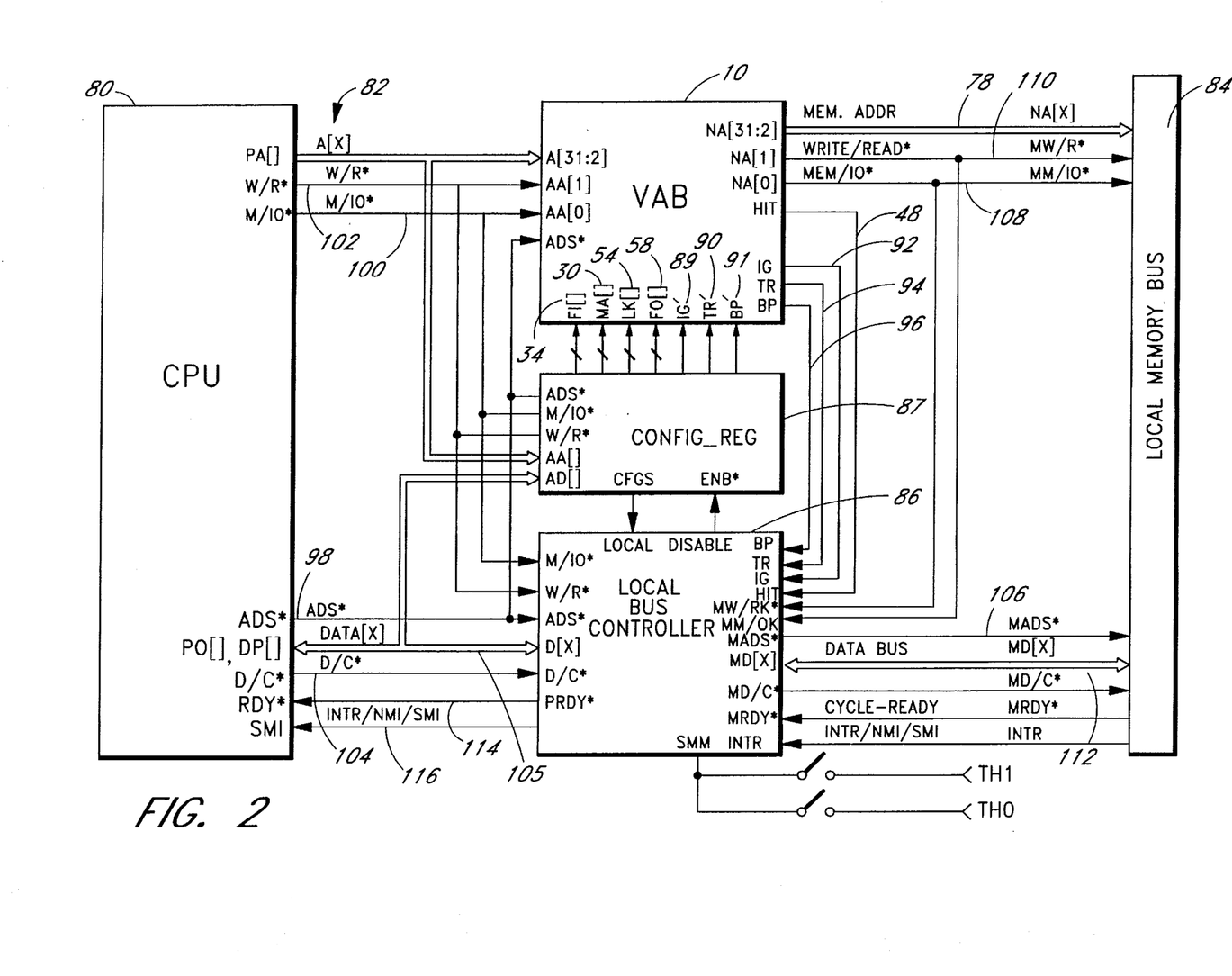
FIG. 2 is a more detailed block diagram of the virtual addressing buffer circuit in combination with a central processing unit and with a local bus controller of a host computer system.

Referring also to FIG. 2, in a preferred embodiment, the virtual addressing buffer circuit (VAB) 10 is used in combination with a CPU 80, a local CPU bus 82, a local memory bus 84 and a local bus controller 86 of an exemplary computer system. In this embodiment, the virtual addressing buffer circuit 10 is used as a buffer between the CPU 80 and the memory bus 84 to more efficiently reroute CPU address requests within the host computer system. The control of the virtual addressing buffer 10 is not fixed, so the operation of the virtual addressing buffer 10 can be altered by the CPU 80 at anytime during the operation of the host computer system. The virtual addressing buffer 10 intercepts a CPU requested address on the local CPU bus 82. The CPU requested address, also referred to as the input address A[31-0], on the bus 12 is sent to the virtual addressing buffer circuit 10 where the filtering and verification portion 14, formatting portion 16, translation portion 18, and command portion 20 of the virtual addressing buffer circuit 10, which have been described above, determine whether the input address A[31-0] from the CPU 80 is to be redirected to a different memory location before the address is sent to a downstream bus, such as the local memory bus 84.

In addition, FIG. 2 illustrates the communication between the virtual addressing buffer 10 and a configuration register, or CONFIG_REG, 87 which stores all of the operating parameters of the virtual addressing buffer circuit 10. The configuration register 87 is a contiguous block of data in local I/O memory which stores the filtering register 24, the match register 26, the lookup register 50, the format register 51 and the command register 88.

In use, the virtual addressing buffer circuit 10 must be initialized before it becomes operable. During the system boot and memory mapping operations, the host computer system reserves a block of its local I/O memory for the configuration register 87 and writes the starting address of the I/O memory block into an index register to which the CPU 80 has access. The CPU 80 does not need to know ultimately where the configuration register 87 is located in the local I/O memory; however, it must know the location of the indexing register which holds the starting address of the configuration register 87. In order to initialize the virtual addressing buffer circuit 10, the CPU 80 must write the desired values for the filtering register 24, the match register 26, the lookup register 50, the format register 51 and the command register 88 into the configuration register 87. Once the values of the configuration register 87 have been initialized, the virtual addressing buffer 10 becomes operable.

After the virtual addressing buffer circuit 10 has been initialized, the CPU 80 can alter any of the register values stored in the configuration register 87 to modify the memory locations to which the CPU 80 requested addresses are mapped at any time during the operation of the host system. For example, if a portion of the system memory is only utilized during an initialization routine of the system software, the CPU 80 can alter the data stored in the command register 87 of a virtual addressing buffer circuit 10 after the system initialization routine is complete to redirect certain address requests to this now unused block of physical memory. The ability of the virtual addressing buffer circuit 10 to redirect address requests during the operation of the system is advantageous over the translation look-a-side buffers of the prior art. The known translation look-a-side buffers are hardwired to the system bus to articulate a specific type of address translation which is unchangeable and is often defined before the ultimate use of the computer is known. Thus, the virtual addressing buffer circuit 10 is more flexible than translation look-aside buffers of the prior art and provides for a more optimized use of the system's physical memory.

In a preferred embodiment as illustrated in FIG. 2, the command signals (the ignore signal IG on the line 92, the terminate signal on the line 94 and the bypass signal BP on the line 96) are connected to the local bus controller 86. The local bus controller 86 reads the status of the command signals and generates the appropriate signals to be delivered to the downstream bus controllers. Each of the command signals are necessitated by different system configurations and by different applications of the virtual addressing buffers 10. As described above, the HIT signal on the line 48 is output at an active level every time an input address matches a stored address. When the HIT signal on the line 88 is at an active level, it indicates that the original input address on the bus 12 has been redirected to a new address location somewhere within the system. The ignore signal IG on the line 92, the terminate signal TR on the line 94, and the bypass signal BP on the line 96 are preferably issued at an active level only when the HIT signal on the line 48 is at an active level and the values of the preset command signals (the IG' signal on the line 89, the TR' signal on the line 90 and the BP' signal on the line 91) are set to an active level. The IG signal and the BP signal are advantageously used when a computer system is simultaneously operating two similar devices or is storing the same data at two different locations on two different busses and one of the devices must be prevented from responding to the address request. Usually one of the devices is located on a local fast bus, such as the local CPU bus 82 or the memory bus 84, and the other device is located on a slower downstream bus. The ignore signal IG is used to enable the device on the local fast bus to respond to the memory request and blocks the slower downstream bus from responding. The bypass signal BP is used to enable the device on the slower downstream bus to respond to the memory request and blocks the device on the local fast bus from responding. The terminate signal TR is active when the virtual addressing buffer 10 is being used for device emulation. In the device emulation case, the terminate signal is sent back to the CPU 80 to end the current bus cycle.

When the command signals are received by the bus controller 86, the bus controller 86 re-routes the CPU defined bus control and bus definition signals in accordance with the status of the command signals. The bus control and definition signals which are redirected depending upon the status of the command signals at the bus controller 86 are an address status output signal (ADS*) on a line 98 which indicates that a valid address request has been sent to the CPU bus 82, a memory I/O signal (M/IO*) on a line 100 which indicates when the requested address is located on memory or an I/O device, a read/write signal (W/R*) on a line 102 which indicates when the bus cycle is a read or write cycle, and a data/code signal (D/C*) on a line 104 which indicates when the information that is to be retrieved is data or an operation code.

For example, in a typical use of the virtual addressing buffer circuit 10, the CPU requested address A[31-0] on the bus 12 is input to the virtual addressing buffer circuit 10 after the completion of operations of the filtering and verification portion 14 (FIG. 1), the formatting portion 16 (FIG. 1), the translation portion 18 (FIG. 1), and the command portion 20 (FIG. 1), the HIT signal 48 is issued at an active level to indicate that the original input address A[31-0] is being redirected to a translated memory address NA[31-0] on the bus 78. If the translated memory address NA[31-0] on the bus 78 is located on a downstream bus, the bus control and bus definition signals are modified by the local bus controller 86 as needed and are passed to the downstream bus along the following signal lines. The ADS* signal is passed downstream as the MADS* signal on the line 106. The M/IO* signal is passed downstream as the MM/IO* signal on the line 108. The W/R* signal is passed downstream as the MW/R* signal on the line 110. The D/C* signal is passed downstream as the MD/C* signal on the line 112. If the translated address NA[31-0] is located on the local CPU bus 82, the ADS* signal on the line 98, the M/IO* signal on the line 100, the W/R* signal on the line 102 and the D/C* signal on the line 104 are maintained on the local CPU bus 82 without alteration and the requested device responds to the CPU 80 using standard handshaking and termination procedures.

In a particularly preferred application of the present system, addresses signals A[0] and A[1] are not typical address signals, rather they are used to differentiate the four bytes in a 32-bit word. Typically, the four bytes are controlled by four byte select lines BE[O], BE[1], BE[2] and BE[3] (not shown) which are communicated to the device being accessed in place of A[0] and A[1]. Thus, A[0] and A[1] are available for other uses. The present invention takes advantage of the availability of the A[1] and A[0] lines to enable the user to manipulate the W/R* and M/IO* signals. Preferably, the W/R* and M/IO* signals are delivered to the virtual addressing buffer circuit via the A[1] signal line 102 and A[0] signal line 100, respectively. The W/R* signal on the line 102 and M/IO* signal on the line 100 are manipulated by the virtual addressing buffer circuit 10 in the same manner as the address signals and are output on the signal lines NA[1] 110 and NA[0] 108, respectively. In other embodiments, if it is desirous to enable all thirty-two address signal lines to carry 32-bits of addressing information, additional lines can be added to the virtual addressing buffer to enable the buffer to manipulate both the 32-bits of addressing information, as well as the bus definition signals such as the W/R* and M/IO* signals.

In another use of the virtual addressing buffer 10, when the CPU requests an address A[31-0] on the bus 12, the virtual addressing buffer circuit 10 reroutes the input address A[31-0] to a translated memory address NA[31-0] and outputs an ignore signal IG on the line 92 at an active level. When the ignore signal 92 is received by the bus controller 86 at an active level, the bus controller 86 generates a disable signal which prevents the MADS* signal on the line 106, the MM/IO* signal on the line 108, the MW/R* signal on the line 110 and the MD/C* signal on the line 112 from being transmitted to a device on the slower downstream bus. Instead, the ADS* signal on the line 98, the M/IO* signal on the line 100, the W/R* signal on the line 102 and the D/C* signal on the line 104 return to the local CPU bus 82 and enable a device on the faster CPU bus 82 to respond to the translated memory address NA[31-0] on the bus 78. Once the translated memory address NA[31-0] is received by the device on the local CPU bus 82, the device on the local CPU bus 82 is responsible for responding to all of the bus handshaking requests and issuing a RDY* signal on a line 114 to terminate the bus cycle, once it has delivered the requested data to a local data bus 105.

In yet another example, when the CPU 80 requests an address A[31-0] on the bus 12, the virtual addressing buffer circuit 10 reroutes the input address A[31-0] to a translated memory address NA[31-0] and outputs the bypass signal BP on the line 92 at an active level. When the bypass signal 92 is received by the bus controller 86 at an active level, the bus controller 86 generates a disable signal and prevents the ADS* signal on the line 98, the M/IO* signal on the line 100, the W/R* signal on the line 102, and the D/C* signal on the line 104 from being delivered to the device on the local CPU bus 82. Instead, the bus controller 86 modifies the bus control and definition signals as needed and passes them onto the downstream memory bus 84 along the following signal lines. The ADS* signal is passed downstream as the MADS* signal on the line 106. The M/IO* signal is passed downstream as the MM/IO* signal on the line 108. The W/R* signal is passed downstream as the MW/R* signal on the line 110. The D/C* signal is passed downstream as the MD/C* signal on the line 112. The translated address NA[31-0] on the bus 78 is passed onto the downstream bus to address the desired device.

In a final example of the virtual addressing buffer 10, the terminate signal TR on the line 94 is issued when the virtual addressing buffer 10 is used to emulate a non-existent device. In a simple emulation example, the virtual addressing buffer 10 translates the CPU requested address A[31-0] on the bus 12 to a translated address NA[31-0] on the bus 78. The virtual addressing buffer 10 in turn outputs the terminate signal TR on the line 94 at an active level which is sent to the local bus controller 86. The translated address NA[31-0] addresses a memory location that contains artificial data values which emulate the data requested from the non-existent device. The data stored at the translated memory location NA[31-0] is placed on the local CPU bus 82 and is sent to the CPU 80 in response to the data request. Upon receipt of the terminate signal on the line 94, the local bus controller 86 generates the RDY* signal on the line 114 which is sent to the CPU 80 indicating that valid data is located on the local data bus 105. In a more complex emulation example, the terminate signal TR on the line 94 causes the local bus controller 86 to generate a CPU interrupt on a line 116 which causes an emulation routine to be initiated, as will be described in more detail below.

A single virtual addressing buffer 10 is only able to detect and execute one address relocation at a given time. Therefore, if multiple addresses need to be relocated, more than one virtual addressing buffer 10 must be used. When multiple virtual addressing buffers 10 are used, it is preferable that the address comparisons by the virtual addressing buffers 10 be performed in parallel to prevent a long delay between the local CPU bus 82 and the downstream busses. When multiple virtual addressing buffers are used in parallel as described above, the HIT signals of the individual buffers 10 are used to select one of the multiple output addresses and one set of the multiple command signals from the outputs of the virtual addressing buffers which is to be ultimately output to the downstream bus.

Figure 3:
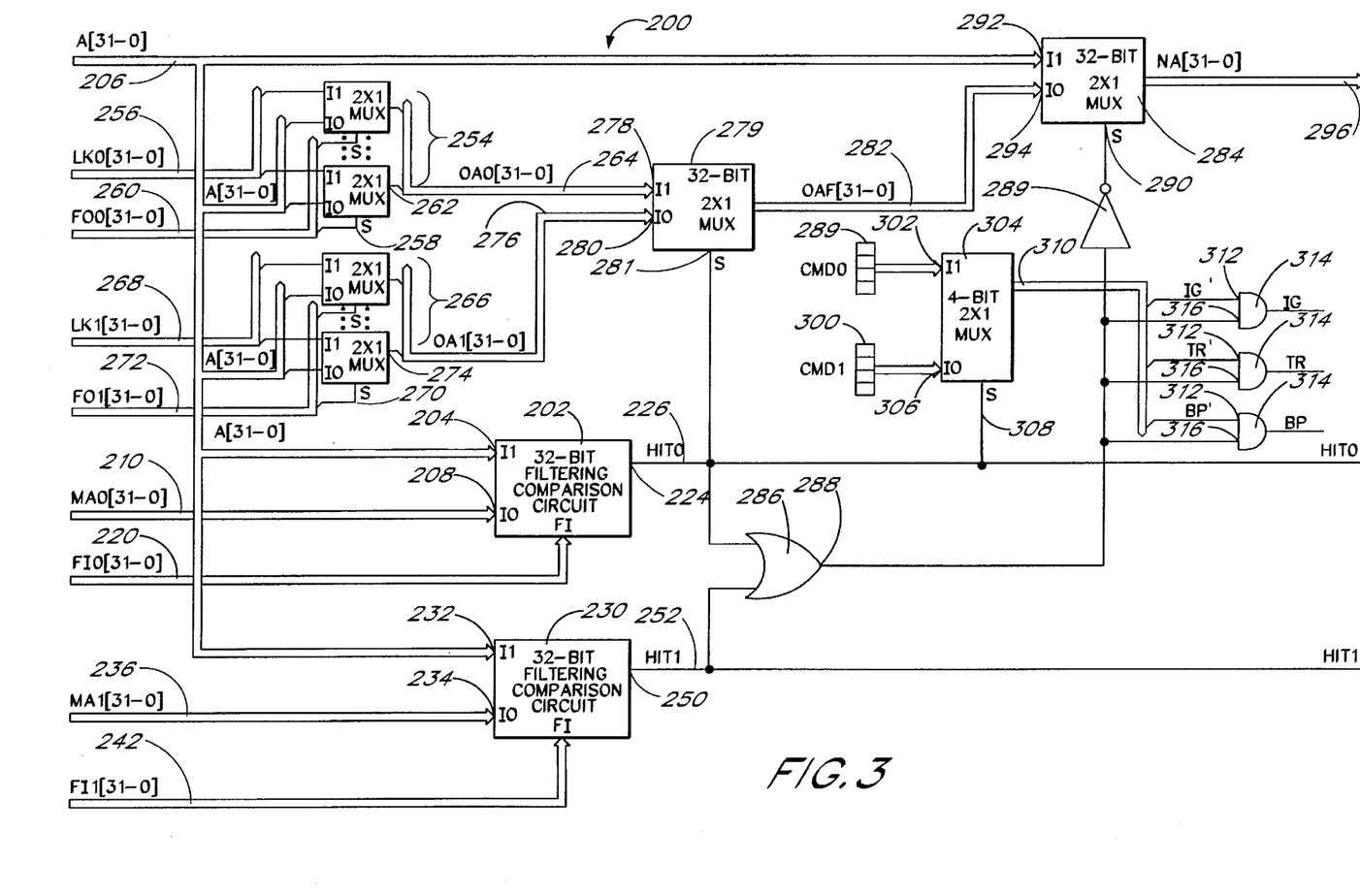
FIG. 3 is a schematic diagram of a preferred embodiment of a dual comparison virtual addressing buffer circuit.

In a preferred embodiment of a dual comparison virtual addressing buffer 200 illustrated in FIG. 3, two virtual addressing buffers 10 are formed in one integrated circuit whereby two addresses comparisons and redirections are performed contemporaneously. In a preferred embodiment, a first 32-bit filtering comparison circuit 202 is connected at an I1 input 204 to an input address A[31-0] on a bus 206 and at an I0 input 208 to a first mask address MA0[31-0] on a bus 210. A first FI input 212 of the first 32-bit filtering comparison circuit 202 is connected to a first filtering address FI0[31-0] on a bus 214 to mask out those address bits which are not important to the address comparison. In a preferred embodiment, each address bit of the input address A[31-0] on the bus 206 is compared to a respective address bit of the first match address MA0[31-0] on the bus 210 to determine whether the address bits match. The match output for each bit will be a logical one if a match occurs. As discussed above, this bit comparison has the effect of an exclusive-NOR function represented by a XNOR gate 40 in FIG. 5 for bit 0. The address bits of the input address A[31-0] on the bus 206 whose values must match the first match address MA0[31-0] on the bus 210 for an address translation to occur are indicated by a logic low value (i.e., a zero), at the corresponding bit location in the first filtering address FI0 [31-0] on the bus 214. The address bits of the input address A[31-0] on the bus 206 whose values do not need to match the first match address MA0[31-0] on the bus 210 for an address translation to occur (i.e., those address bits that have a don't care condition), are indicated by a logic high value (i.e., a one), at the corresponding bit location in the first filtering address FI0[31-0]. Each OR gate 44 with an address comparison input of a don't care bit will be forced to a logic high value at the output by the logic high value of the filtering address bit regardless of the address comparison. On the other hand, if the respective address bit compare (i.e., both are a logic one or both are a logic zero), then the output of the OR gate 44 will be a logic one irrespective of the filter bit. The outputs of all of the OR functions are logically ANDed together to determine if all of the relevant address bits of the input address A[31-0] on the bus 206 match the respective bits of the first match address MA0[31-0] on the bus 210. If a match has occurred, an output 224 of the filtering comparison circuit 202 is at a logic high level. If a match did not occur, the output 224 of the filtering comparison circuit 202 is at a logic low level. The output 224 of the first 32-bit filtering comparison circuit 202 is connected to a HIT0 signal on a line 226 which is an active high signal. The HIT0 signal indicates when the relevant bits of an input address A[31-0] on the bus 206 are equivalent to the corresponding bit of the first match address MA0[31-0] on the bus 210. If the two addresses are equivalent, the HIT0 signal on the line 226 is set to an active level. If the two addresses are not equivalent, the HIT0 on the line 226 is set to an inactive level.

In a preferred embodiment, a second 32-bit filtering comparison circuit 230 is connected at an I1 input 232 to the input address A[31-0] on the bus 206 and at an I0 input 234 to a second mask address MA1[31-0] on a bus 236. A FI input 238 of the second 32-bit filtering comparison circuit 230 is connected to a second filtering address FI 1 [31-0] on a bus 240 to mask out those address bits which are not important to the address comparison. The operation of the second filtering address comparison circuit is 230 identical to the operation of the first filtering comparison circuit 202 described above. An output 250 of the second filtering comparison circuit 230 is connected to a HIT1 signal on a line 252 which is an active high signal. The HIT1 signal indicates when the relevant bits of an input address A[31-0] on the bus 206 are equivalent to the corresponding bit of the second match address MA1 [31-0] on the bus 236. If the two addresses are equivalent, the HIT1 signal on the line 252 is set to an active level. If the two addresses are not equivalent, the HIT1 signal on the line 252 is set to an inactive level.

Contemporaneously with the address comparisons, two formatted output addresses are prepared. A first set of thirty-two single-bit multiplexers 254 are used to create a first formatted output address OA0[31-0] from the bits of the input address A[31-0] on the bus 206 and from the first lookup address LK0[31-0] on the bus 256 depending on the state of a select input 258 of the single-bit multiplexers 254. The select input 258 of each multiplexer 254 are connected to a respective bit from a first format address FO0[31-0] on a bus 260. Respective outputs 262 of the first thirty-two multiplexers 254 are combined to form a first formatted output address OA0[31-0] on a bus 264 which is a combination of address bits from the input address A[31-0] on the bus 206 and the first lookup address LK0[31-0] on the bus 256. A second set of thirty-two single-bit multiplexers 266 are used to select between a bit from the input address A[31-0] on the bus 206 and a bit from a second lookup address LK1[31-0] on a bus 268 depending on the state of a select input 270 of each multiplexer 266. The select input 270 is connected to a bit from a second format address FO 1 [31-0] on a bus 272. Each output 274 of the second set of thirty-two multiplexers 266 are combined to form a second formatted output address OA1[31-0] on a bus 276 which is a combination of the address bits from the input address A[31-0] on the bus 206 and the second lookup address LK1[31-0] on the bus 268.

The first output address OA0[31-0] on the bus 264 is connected to an I1 input 278 of a first 32-bit 2×1 multiplexer 279. A second output address OA1 [31-0] on the bus 276 is connected to respective I0 inputs 280 of the first 32-bit 2×1 multiplexer 279. The HIT0 signal on the line 226 is connected to a select line 281 of the multiplexer 279 and is used to select between the first formatted output address OA0 [31-0] on the bus 264 and the second formatted output address OA1[31-0] on the bus 276 for output as a final formatted output address OAF[31-0] on a bus 282. If the HIT0 signal on the line 226 is at an active level, indicating that the relevant bits of the input address on the bus A[31-0] are equivalent to a first match address MA0[31-0] on the bus 210, then the first formatted output address OA0[31-0] on the bus 264 is selected for output as the final formatted output address OAF[31-0] on the bus 282. If the HIT0 signal on the line 226 is at an inactive level, two conditions could have caused this to occur. Either, the relevant bits of the input address A[31-0] on the bus 206 are equivalent to the second match address MA1[31-0] on the bus 236 or neither of the match addresses MA0[31-0] or MA1[31-0] matched the respective relevant bits of the input addresses A[31-0]. In either case, the second formatted output address OA1[31-0] on the bus 276 is always selected for output because, in the case that neither input address matches the stored match register, it does not matter which formatted output address is advanced as ultimately the original input address A[31-0] on the bus 206 will be selected for the final output. Using the configuration described in association with FIG. 1, the use of the HIT0 signal on the line 226 as the select signal for the first 32-bit multiplexer 279 indicates that the first formatted output address OA0[31-0] on the bus 264 has priority over the second formatted output address OA1[31-0] on the bus 276. Thus, if the HIT1 signal on the line 252 and the HIT0 signal on the line 226 are both active, indicating that a match was made with both filtered input addresses, then the first formatted output address OA0[31-0] on the bus 264 will be selected for output over the second formatted output address OA1[31-0] on the bus 276, since the HIT0 signal on the line 226 is chosen to control the select line 281 of the first 32-bit 2×1 multiplexer 279. The output of the first 32-bit 2×1 multiplexer 279 is advanced as the final formatted output address OAF[31-0] on the bus 282.

The HIT0 signal on the line 226 and the HIT1 signal on the line 252, are each connected to an input of a two-input NOR gate 286. An output 288 of the OR gate 286 is inverted utilizing an inverter 289 before it is sent to a select line 290 of a second 32-bit 2×1 multiplexer 284. An I1 input 292 of the second 32-bit 2×1 multiplexer 284 is connected to the input address A[31-0] on the bus 206. An I0 input 294 of the second 32-bit 2×1 multiplexer 284 is connected to the final formatted output address OAF[31-0] on the bus 282. The select line 290 of the second 32-bit multiplexer 284 selects between the final formatted output address OAF[31-0] on the bus 282 and the original input address A[31-0] on the bus 206. If neither the HIT0 signal on the line 226 nor the HIT1 signal on the line 252 are active, then the filtered input address did not match either of the stored match addresses and the output of the OR gate 288 is a logic low signal. The logic low signal is inverted by the inverter 289, thus connecting a logic high signal to the select line 290 of the second 32-bit 2×1 multiplexer 284, causing the input address A[31-0] on the bus 206 which is connected to the I1 input 292 of the multiplexer 284 to be output as the translated memory address NA[31-0] on a bus 296 without alteration. If either the HIT0 on the line 226 or the HIT1 signal on the line 252 are active, then a match occurred between one of the filtered input address and one or more of the stored match addresses, therefore the output of the OR gate 288 is an logic high signal. The logic high signal is inverted by the inverter 289 and therefore connects a logic low signal to the select line 290 of the second 32-bit 2×1 multiplexer 284, causing the final formatted output address OAF[31-0]294 which is connected to the I0 input 294 of the second 32-bit multiplexer 284 to be output as the translated memory address NA[31-0] on the bus 296.

In addition to controlling the address output, the dual comparison virtual addressing buffer circuit 200 also controls the output of the command signals for each comparison. A first command register CMD0 298 stores a first set of preset command signal values IG0', TR0' and BP0'. A second command register CMD1 300 stores a second set of preset command signal values IG1', TR1' and BP1'. The first set of preset command signals is connected to an I1 input 302 of a 4-bit 2×1 multiplexer 304. The second set of preset command signals is connected to an I0 input 306 of the 4-bit 2×1 multiplexer 304. The select input 308 of the multiplexer is connected to the HIT0 signal on the line 226. If the HIT0 signal on the line 226 is at an active level, indicating that the relevant bits of the input address on the bus A[31-0] on the bus 206 are equivalent to a first match address MA0[31-0] on the bus 210, then the first set of preset command signal values IG0', TR0' and BP0' are output from the multiplexer 304 to a bus 310. If the HIT0 signal on the line 226 is at an inactive level, two conditions could have caused this to occur. Either, the relevant bits of the input address A[31-0] on the bus 206 are equivalent to the second match address MA1[31-0] on the bus 236 or neither of the match addresses MA0[31-0] or MA1[3-1] matched the respective relevant bits of the input addresses A[31-0]. In either case, the second set of preset command signal values IG1', TR1' and BP1' are output from the multiplexer 304 to the bus 310. The use of the HIT0 signal on the line 226 as the select signal for the first 4-bit multiplexer 304 indicates that the first set of preset command signals has priority over the second set of preset command signals. Thus, if the HIT1 signal on the line 252 and the HIT0 signal on the line 226 are both active, indicating that a match was made with the relevant bits of both match addresses, then the first set of preset command signals will be selected for output over the second set of preset command signals, since the HIT0 signal on the line 226 is chosen to control the select line of the first 4-bit 2×1 multiplexer 279.

In order to prevent the command signals from being output at a logic high level from the dual comparison virtual addressing buffer circuit 20 when an address match did not occur, each of the preset command signals is gated before it is output. Each of the preset command signals which is an output of the first 4-bit 2×1 multiplexer 304 is connected to a first input 312 of a respective two-input AND gate 314. A second input 316 of the two-input AND gate 314 is connected to the output 288 of the of the OR gate 286. If neither the HIT0 signal on the line 226 nor the HIT1 signal on the line 252 is active, then the filtered input address did not match either of the stored match addresses and the output of the OR gate 288 is an logic low signal. A logic low signal connected to the inputs 316 of the two-input AND gates 314 will mask the preset values of the command signals, and the outputs of the AND gates 314 will be forced to logic low values regardless of the preset input values. If either the HIT0 on the line 226 or the HIT1 signal on the line 252 is active, then a match occurred between one of the filtered input address and one or more of the stored match addresses. Therefore, the output of the OR gate 288 is a logic high signal. A logic high signal connected to the inputs 316 of the two-input AND gates 314 will enable the preset values of the command signals IG', TR' and BP' to pass through the AND gate 314 without alteration. Utilizing the dual comparison virtual addressing buffer 200, the two address comparisons, redirections and the control of the command signals of the dual comparison embodiment are completed in approximately the same time period that it took to complete the single comparison, redirection and control of the command signals in the single comparison virtual addressing buffer circuit embodiment 10.

Figure 4:
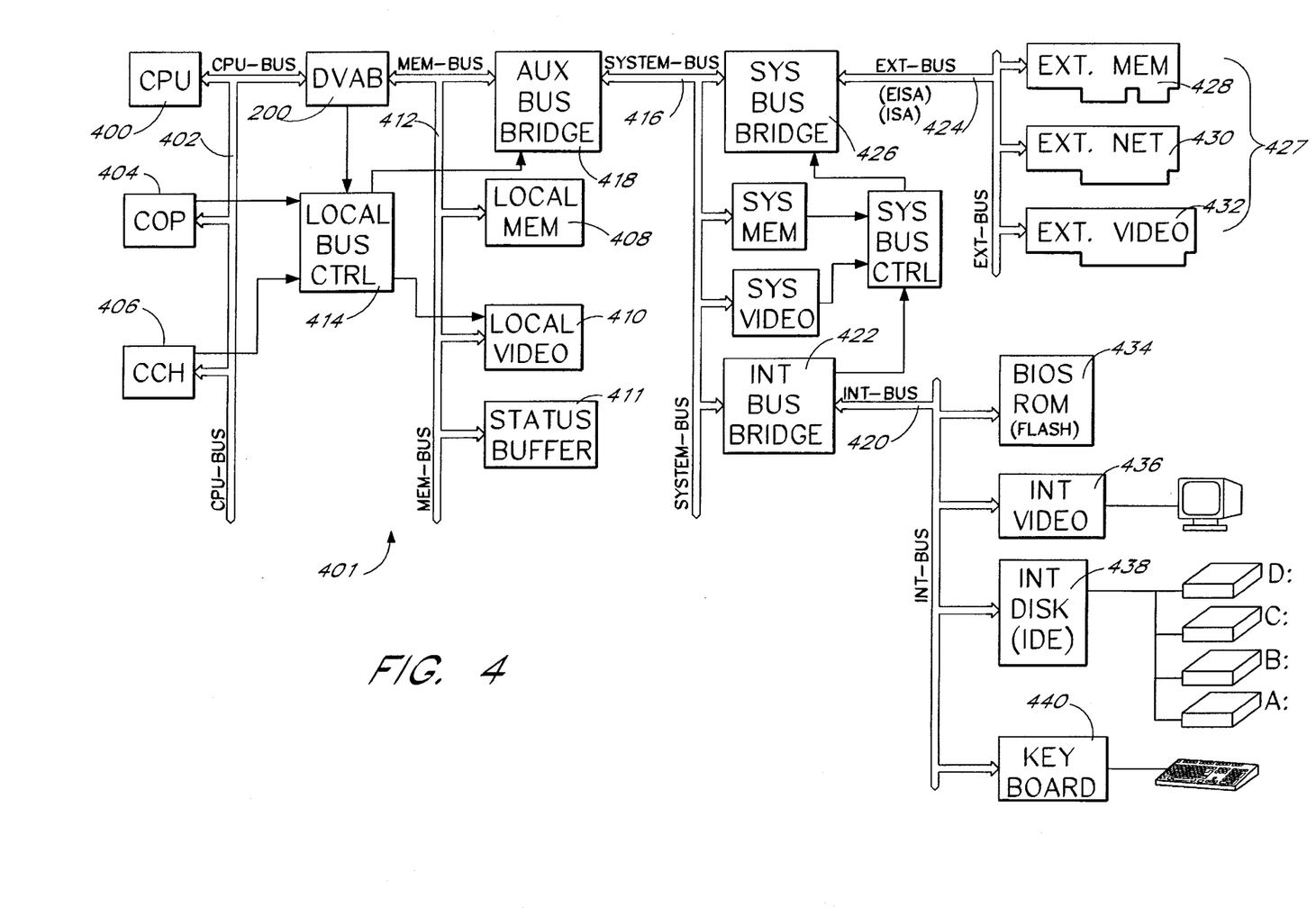
FIG. 4 is a block diagram of a host computer system in communication with a dual comparison virtual addressing buffer circuit.

FIG. 4 illustrates the dual comparison virtual addressing buffer circuit (DVAB) 200, as illustrated in FIG. 3, in communication with a CPU 400 in a host computer system 401. The CPU 400 is also in communication with an upgrade processor or a co-processor (COP) 404 and a cache controller (CCH) 406 along a local CPU_BUS 402. In addition, the CPU 400 is in communication with local memory 408, local video memory 410 and a local status buffer 411 along a local memory bus, MEM_BUS, 412. The dual comparison virtual addressing buffer 200 and a local bus arbitrator 414 are located between the CPU_BUS 402 and the MEM_BUS 412 to manage the address requests from the CPU 400. Further, the MEM_BUS 412 is in communication with a system bus, SYSTEM-BUS, 416 via an axillary bus bridge 418. Lastly, the system bus 416 is in communication with an internal bus, INT_BUS, 420 via an internal bus bridge 422 and an external bus, EXT_BUS 424, via a system bus bridge 426. The external bus 424 is in communication with system expansion cards 427 such as, external memory cards 428, external network controller cards 430, and external video controller cards 432. Typically, the external bus 424 utilizes a standard bus control format such as EISA or ISA to control the communications with the expansion cards 427. The internal bus 420 communicates with integrated system elements such as BIOS ROM 434, an internal video controller 436, an internal disk controller 438 and a keyboard controller 440. The internal bus 420 can use any system defined bus control protocol known to one of skill in the art.

The dual comparison virtual addressing buffer 200 can be used to optimize the physical address space of the host a computer system 401 in a number of ways. Notably, the dual comparison virtual addressing buffer 200 can be used to implement "paged system BIOS shadowing" a technique which is commonly used to increase processing speeds. The BIOS shadowing feature enables the frequently accessed code from the system BIOS to be copied from the relatively slow access ROM storage 434 to the local memory 408 of the high-speed CPU 400 in order to increase the speed of BIOS address requests. Typically, the BIOS addresses that are stored in the ROM are compressed to enable all of the BIOS commands to be stored in the small storage area of the ROM 434. Therefore, in order to copy the BIOS commands, the paged addresses are decompressed and stored in the local memory 408. In addition, the locations in the local memory 408 where the BIOS commands are stored are write protected to prevent the BIOS commands from being corrupted.

In one example, the entire contents of the system BIOS ROM 434 is decoded and copied from the ROM 434 on the INT_BUS 420 to local memory 408 on the local memory bus 410. As is well known in the art, the ROM addresses are advantageously stored in a paged format to reduce the address space required to access each of the BIOS commands. In use, as the CPU 80 requests one of the paged BIOS addresses, a first portion of the dual comparison virtual addressing buffer 200 will redirect the requested address to the correct page location in the local memory 408. A first match address MA0[31-0] is used to redirect a first BIOS paged access request from the slow downstream BIOS 434 to the appropriate page location in the local memory 408 where the BIOS commands are now stored. A second match address MA1 [31-0] is used to terminate all write accesses to the addresses in local memory 408 where the BIOS commands are stored. When a write request is received by the dual comparison virtual addressing buffer 200 which matches the write protected addresses of the second match address MA1[31-0], the dual comparison virtual addressing buffer 200 will issue an ignore command which will indicate to the local bus controller 414 to ignore the write request (W/R*) to prevent access to the protected local memory area 408. As described above, the W/R* and M/IO* signals are altered by the virtual addressing buffer circuit via the A[1] and A[0] input lines, respectively.

In order to implement paged BIOS shadowing using conventional translation look-a-side buffers, an individual translation look-a-side buffer would have to be provided for each page of addresses of the BIOS ROM 434 that are redirected to the local memory 408. In the case of a 128 KB BIOS ROM 434 which is paged in 16 KB pages, eight conventional translation look-a-side buffers would be required to redirect the addresses of the eight pages of commands which are stored in the ROM 434 and additional control logic would be required to block the write lines from being transmitted to the ROM locations 434 in the local memory 408. A similar sized BIOS ROM 434 can be converted to local memory 408 using the dual comparison virtual addressing buffer 200 as described above.

Secondly, to better utilize the existing physical memory, "memory ranged blanking" can be overcome to reclaim physical memory addresses which are blanked out by the CPU in order to address external devices. Typically, in a DOS compatible system certain logical address locations are reserved for accessing memory mapped external devices. The corresponding physical memory locations to these memory mapped addresses are unused as their address must be reserved to access the external devices. Therefore, blocks of the physical memory are wasted because their addresses are reserved for the access of memory mapped external devices. To enable the use of the wasted physical memory space which is reserved to access external devices, a first portion of the dual comparison virtual addressing buffer 200 can be used to direct address requests for the reserved memory mapped space to the downstream bus where the requested external device is located. In addition, the system memory is configured at start-up such that the CPU 400 is informed that a block of memory the size of the blanked out memory mapped space exists over and above the physical memory space. A second portion of the virtual addressing buffer 200 redirects the memory requests for memory locations above the physical address space to the physical memory space which was blocked from direct access by the first portion of the dual virtual addressing buffer 200.

For example, in a DOS compatible system, a 1 MB address space between 15 MB and 16 MB is reserved for an external network controller card 430. If a 32 MB physical memory space is available, the CPU 400 is informed that a 33 MB memory is available for access. A first portion of the dual virtual addressing buffer 200, is used to send any address requests in the 15 MB to 16 MB range to the slower downstream external bus 424 where the network controller card 430 is located. The first portion of the dual virtual addressing buffer 200 generates a bypass signal BP when the CPU requested address matches any of the addresses in the 15 MB to 16 MB address range to inform the local CPU BUS 402 to bypass the local memory bus 412 and to pass the addresses along with the bus definition and control signals onto the slower downstream EXT_BUS 424 where the network controller card 430 is located. A second portion of the dual virtual addressing buffer 200 is used to translate the CPU addresses requests in the 32 MB to 33 MB range to the physical address space in the 15 MB to 16 MB range which is being unused. The second portion of the dual virtual addressing buffer 200 will generate an ignore signal to inform the downstream EXT_BUS 428 to ignore the redirected address requesting the 15 MB to 16 MB range to prevent the external network controller card 430 at the 15 MB to 16 MB memory-mapped address location from answering the request and thereby enabling the local memory 408 at the 15 MB to 16 MB range to respond.

Advantageously, by utilizing the dual virtual addressing buffer embodiment 200 for each block of physical memory space which is blocked from use by memory mapped external device such as video devices 436, disk drive devices 438, network devices 430, etc., the memory space can be remapped for use by the CPU 400 thus optimizing the use of the physical memory space of the computer system without requiring the addition of excessive circuitry.

In addition, if the physical memory is larger than the logical memory space of the CPU, a memory mapping scheme known as "windowing" is used to access the larger physical memory space within the smaller logical memory window. The virtual addressing buffer will enable the host system to dynamically slide the window to view the entire physical memory space by first configuring the system memory map to include a memory space above the logic memory space of the CPU. Next, the virtual addressing buffer circuit filters out any bits of a CPU requested address which are not relevant to a determination of whether the CPU requested address matches the stored match address. After filtering out the irrelevant bits, the virtual addressing buffer compares the resultant filtered CPU requested address to a stored match address to determine whether the CPU requested address is located above the logical memory space of the CPU. Simultaneously, the virtual addressing buffer circuit formats an output address utilizing bits from a translated address and from the CPU requested address to re-route the CPU address request to the appropriate location above the logical address space. Finally, the virtual addressing buffer selects either the original CPU requested address or the formatted output address to output as the output address depending upon the results of the comparison of the resultant filtered CPU requested address to a stored match address. In a preferred embodiment, if the CPU requested address is to be directed to a physical address above the logical address space, then the virtual addressing buffer circuit outputs the formatted output address. If the CPU requested address is to be directed to a physical address within the logical address space, then the virtual addressing buffer circuit outputs the original CPU address request without alteration. For example, this would enable a 16-bit CPU to access a 32-bit memory bus system with the addition of a virtual addressing buffer circuit to the existing circuitry.

Thirdly, program debugging, I/O trapping and device emulation can be enhanced using the terminate signal TR of the virtual addressing buffer circuit. A simple emulation scheme was described above. However, using the embodiment described below, a more complex device emulation can be implemented in association with the dual comparison virtual addressing buffer 200. A first portion of the dual comparison virtual addressing buffer 200 intercepts an address request for the address location of the device which is physically not present ("non-existent device") and redirects the address to an emulation location in the local memory 408. A second portion of the dual comparison virtual addressing buffer 200 reads the emulated data stored in the local memory status buffer 411 and provides the emulated data to the CPU 400. If the address of the non-existent device is requested by the CPU 400, the first portion of the dual comparison virtual addressing buffer 200 redirects the address request to a translated address location and issues the terminate signal at an active level. The terminate signal is sent to the local bus controller 414 which generates an interrupt to the CPU 200 upon the receipt of the terminate command. The receipt of the interrupt by the CPU 200 begins the operation of an interrupt routine. The interrupt routine accesses the redirected emulation memory location in the local memory 408 which stores the emulated data. The CPU 400 will write the emulated data from the redirected emulation memory location to the local memory status buffer 411. The type of emulated data that is supplied to the local memory status buffer 411 is based on the device which was originally requested by the CPU 400. The second portion of the dual comparison virtual addressing buffer 200 is accessed at the termination of the interrupt routine. The second portion of the dual comparison virtual addressing buffer 200 reads the emulated data stored in the local memory status buffer 411 and provides the emulated data to the CPU 400 as if the emulated device itself responded.

Advantageously, this type of device emulation can be used to debug both hardware and software by supplying the CPU with known responses to information requests. The reaction of the hardware and/or the software to these known responses can be monitored and debugged accordingly. The virtual addressing buffer provides the user with full control of the emulated responses to the CPU requests thus providing the user with the type of flexibility required to properly debug hardware or software for all possible parameters. Further, the virtual addressing buffer is considerably less expensive than the expensive processor analyzer systems which are typically used to debug hardware and software systems. These processor analyzers are expensive and cumbersome and do not provide the user with as much flexibility as the virtual addressing buffer circuit.

Additionally, the virtual addressing buffer can be used to intercept the commands from a CPU intended for one device and to redirect the commands to a second device which will respond to the CPU. This will enable a newer, improved, or previously incompatible device to replace the old device which is hard coded within an existing application software. The virtual addressing buffer circuit enables the new device to appear compatible with the old system by intercepting the commands from the older applications software and re-routing the commands to a memory location where an equivalent command which is compatible with the new device is stored. This compatible command replaces the original CPU request and enables the new device to respond with the requested information. In other words, a new system with improved peripherals can be made to run with old software by making the new system appear compatible with the old system.

More specifically, the dual virtual addressing buffer comparison circuit is able to intercept an address request from the CPU for an address location of a first device and re-route it to a second device as follows. A first portion of the dual virtual addressing buffer intercepts an address request from the CPU for an address location of a first device and generates an interrupt signal which is sent to the CPU. The CPU is interrupted in response to the receipt of the interrupt signal and an interrupt routine is triggered by the receipt of the interrupt signal. The interrupt routine copies a command compatible with a second device stored in local memory to a memory status buffer. A second portion of the dual virtual addressing buffer copies the compatible command stored in the local memory status buffer to the system bus, thereby enabling access to the second device with a compatible command. It should be understood that the virtual addressing buffer can be used to make new application software operate with old physical devices in a similar manner.

A virtual addressing buffer constructed in accordance with the present invention offers several advantages. First, the virtual addressing buffer provides improved flexibility in all aspects of address comparison and redirection to enable the relocation of the logical address space of a computer system. Further, the virtual addressing buffer can improve many computer optimization applications, such as implementing "paged system BIOS shadowing", overcoming "memory range blanking" and improving device emulation configurations. Finally, the virtual addressing buffer enables the operation of newer and/or improved devices within a system in which such devices were previously incompatible.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A virtual addressing buffer circuit wherein an input address is translated into an output address, said virtual addressing buffer circuit comprises:

a filtering and verification portion for comparing a stored match address to an input address and for filtering out any bits of the input address which are not relevant to a determination of whether the input address matches the stored match address;

a formatting portion for generating a formatted output address from a translated address and from said input address; and a translation portion for selecting between said input address and said formatted output address for output as said output address.

2. A virtual addressing buffer circuit as defined in claim 1, wherein a format address determines which address bits in said formatted output address are from said input address and which address bits in said formatted output address are from said translated address.

3. A virtual addressing buffer circuit as defined in claim 2, wherein said formatting portion comprises a plurality of 2×1 multiplexers, wherein each bit of said input address is connected to a first input of one of said 2×1 multiplexers and a corresponding bit of said translate address is connected to a second input of said one of said 2×1 multiplexers and a corresponding bit of said format address is connected to a select input of said one of said 2×1 multiplexers.

4. A virtual addressing buffer circuit as defined in claim 1, wherein said filtering and verification portion outputs a HIT signal which indicates when the relevant bits of said input address are equivalent to the corresponding bits of said stored match address.

5. A virtual addressing buffer circuit as defined in claim 4, wherein said translation portion comprises a multiple-bit 2×1 multiplexer, a first input of said multiple-bit 2×1 multiplexer is connected to said input address, a second input of said multiple-bit 2×1 multiplexer is connected to said formatted output address and said select input is connected to said HIT signal for selecting between said input address and said formatted output address for output as said output address.

6. A method of translating an input address to a translated output address comprising the steps of:

comparing a stored match address to said input address;

filtering out any bits of said address comparison which are not relevant to a determination of whether the input address is to be translated;

generating a formatted output address from the bits of a translated address and said input address; and selecting between said input address and said formatted output address for output as said translated output address depending on the result of the address comparison between said stored match address and said input address.

7. The method of translating an input address as described in claim 6 additionally comprising the steps of:

providing a set of command signals, each of said command signals having a respective preset condition, each preset condition having an active level and an inactive level; and outputting a command signal at an active level if the respective preset condition of the command signal is at an active level when the relevant bits of said input address match the corresponding bits of the stored match address.

8. A method of utilizing a physical memory of a computer system which is larger than the logical memory space of a CPU by enabling the use of memory blocks which are above the logical memory space of a CPU, comprising the steps of:

configuring the system memory map to include a memory space above the logic memory space of the CPU;

filtering out any bits of a CPU requested address which are not relevant to a determination of whether the CPU requested address matches a stored match address to provide a resultant filtered CPU requested address;

comparing the resultant filtered CPU requested address to the stored match address to determine whether the CPU requested address is located above the logical memory space of the CPU;

formatting an output address from a translated address and from said CPU requested address to provide a formatted output address; and selecting between said CPU requested address and said formatted output address for output as said output address based upon the results of the comparison of said resultant filtered CPU requested address to a stored match address.

* * * * *